(12) United States Patent
Pichot

(10) Patent No.: US 9,689,722 B2
(45) Date of Patent: Jun. 27, 2017

(54) METHOD FOR MONITORING A TRANSMITTER AND CORRESPONDING TRANSMITTER

(71) Applicant: KROHNE Messtechnik GmbH, Duisburg (DE)

(72) Inventor: Vincent Pichot, Romans sur Isere (FR)

(73) Assignee: KROHNE Messtechnik GmbH, Duisburg (DE)

( * ) Notice: Subject to any disclaimer, the term of this patent is extended or adjusted under 35 U.S.C. 154(b) by 895 days.

(21) Appl. No.: 13/630,432

(22) Filed: Sep. 28, 2012

(65) Prior Publication Data

US 2013/0178176 A1 Jul. 11, 2013

(30) Foreign Application Priority Data

Jan. 9, 2012 (DE) .................. 10 2012 000 187

(51) Int. Cl.
| | |
|---|---|
| *G01D 18/00* | (2006.01) |
| *G06F 11/07* | (2006.01) |
| *G05B 23/02* | (2006.01) |
| *H04B 17/17* | (2015.01) |

(52) U.S. Cl.
CPC ............ *G01D 18/00* (2013.01); *H04B 17/17* (2015.01); *G05B 23/0291* (2013.01); *G05B 2219/14114* (2013.01); *G06F 11/07* (2013.01)

(58) Field of Classification Search
CPC ......... G01D 18/00; G01D 18/008; H04J 3/00; H04B 17/17; G06F 11/07; G05B 2219/14114; G05B 23/0291
See application file for complete search history.

(56) References Cited

U.S. PATENT DOCUMENTS

| | | | |
|---|---|---|---|
| 4,723,122 A | 2/1988 | Maltby et al. | |
| 4,849,754 A | 7/1989 | Maltby et al. | |
| 5,005,142 A * | 4/1991 | Lipchak ............... | G06F 11/0709 |
| | | | 376/245 |
| 6,017,143 A | 1/2000 | Eryurek et al. | |
| 6,043,636 A * | 3/2000 | Gaudreau ............... | H02M 1/34 |
| | | | 323/282 |
| 7,085,255 B2 * | 8/2006 | Jacques et al. ............... | 370/347 |
| 7,139,683 B2 * | 11/2006 | Pfundlin ................ | G08C 19/02 |
| | | | 324/500 |
| 7,539,600 B2 | 5/2009 | Pfundlin et al. | |
| 8,044,792 B2 * | 10/2011 | Orr et al. ...................... | 340/506 |

(Continued)

*Primary Examiner* — Regis Betsch
(74) *Attorney, Agent, or Firm* — David S. Safran

(57) ABSTRACT

A method for monitoring a transmitter (1) with a measurement (2) and a transmission unit (3), with which a measurement (2) signal is generated that is dependent on a measurement quantity, and with the transmission unit (3) receiving the measurement signal, and based on the measurement signal, an output signal is transferred to a signal transmission element (4). To makes it possible to recognize an error, an input signal is taken from the signal transmission element (4) and is transferred to the measurement unit (2) as a comparison signal which corresponds to the input is compared with a stored signal and based upon the outcome of the comparison, either the measurement signal is transferred from the measurement unit (2) to the transmission unit (3) or the transmission unit (3) is shifted into a definable state and an error signal is transferred to it.

7 Claims, 3 Drawing Sheets

(56) References Cited

U.S. PATENT DOCUMENTS

| | | |
|---|---|---|
| 8,180,466 B2 | 5/2012 | Longsdorf et al. |
| 8,380,463 B2* | 2/2013 | Philipps .................. 702/189 |
| 2002/0082799 A1* | 6/2002 | Pramanik ............ G01D 3/02 |
| | | 702/130 |
| 2005/0113942 A1 | 5/2005 | Longsdorf et al. |
| 2005/0189017 A1 | 9/2005 | Eryurek |
| 2006/0154709 A1* | 7/2006 | Takamuku ........... G08C 19/02 |
| | | 455/899 |
| 2010/0083768 A1* | 4/2010 | Hedtke ............... G01L 27/007 |
| | | 73/724 |
| 2010/0145481 A1* | 6/2010 | Philipps ............... G01D 21/02 |
| | | 700/32 |
| 2010/0211342 A1 | 8/2010 | Blessing |
| 2012/0224497 A1* | 9/2012 | Lindoff ................ H04B 1/525 |
| | | 370/252 |
| 2013/0178176 A1* | 7/2013 | Pichot ...................... 455/115.1 |

* cited by examiner

METHOD FOR MONITORING A TRANSMITTER AND CORRESPONDING TRANSMITTER

BACKGROUND OF THE INVENTION

Field of the Invention

The invention relates to a method for monitoring a transmitter. Here, the transmitter comprises at least one measurement unit and one transmission unit. The measurement unit and the transmission unit are interconnected at least for transmission of signals. The measurement unit is used to determine at least one measurement quantity and to produce a measurement signal which is dependent on it. The transmission unit receives the measurement signal from the measurement unit and is used to transfer an output signal to at least one signal transmission element, based on the measurement signal. The invention also relates to a corresponding transmitter which comprises at least one measurement unit and one transmission unit.

Description of Related Art

Transmitters—alternative names are transducers or field devices—of the aforementioned type have been known for a long time and are used quite generally to detect the primary sensor signal which originates from a sensor unit or a sensor element and to convert it into a generally standardized signal as an electrical output signal so that it can be used for example, by a higher-level process monitoring unit or control unit.

The term transmitter should be understood as not being limiting in any way. The sensor unit can be used especially for measurement of physical or chemical measurement quantities, for example, flow rate, mass flow rate, pressure, temperature, fill level, pH value, etc. This transmitter can be divided at least into two parts for the general examination: into a measurement unit which is used for the measurement in itself and which provides a measurement signal originating from the measurement, and into a transmission unit which receives the measurement signal and transfers it, for example, via a field bus to a higher-level unit. Thus, one part of the transmitter performs the task of actual measurement and the other part of the transmitter communicates the measurement value which has been obtained in the measurement, or optionally, the acquired measurement values to other units.

Depending on the application, transmitters must satisfy different safety requirements. Thus, in particular, possible error sources must be recognized, and optionally, there must be safety measures. For errors, critical regions are, for example, the measurement itself, the signal processing or data processing in the transmitter and also the communication with, for example, the units which are at a higher level than the transmitter. In order to satisfy the respective safety requirements, for example, the SIL (Safety Integrity Level) standard which is important in process automation, there must be, for example, redundancy or diversity for the transmitters. Redundancy, here, means a doubled or multiple layout of safety-relevant components. Diversity means that the hardware components or software programs used originate from different manufacturers or are of different type. Both redundant and also diverse configurations are generally complex and/or cost-intensive.

For example, European Patent Application EP 1 466 308 B1 and corresponding U.S. Pat. Nos. 7,539,600 and 7,139, 683 disclose a sensor arrangement with a measurement detector which generates a raw signal, and with an output stage which outputs an output signal. Between the measurement detector and the output stage, transmission and conversion of the raw signal into the output signal occur. An additional monitoring unit generates an auxiliary signal from the raw signal and compares it to the output signal in order to signal deviations beyond a predetermined framework. It is disadvantageous that a second unit must be provided for processing of the raw signal. At the same time, only the signal path within the transmitter is monitored in this way.

A quantity which is relevant for assessing a transmitter with respect to safety is the safe failure fraction (SFF) which indicates how large the portion of the safe error in the altogether possible errors is. A safe error is an error which is relevant to safety and which however either is recognized or transfers the transmitter into a safe state.

SUMMARY OF THE INVENTION

Therefore, a primary object of the present invention is to devise a method for monitoring a transmitter, and a corresponding transmitter, which increases the safe failure fraction in the pertinent transmitter.

The method in accordance with the invention in which the aforementioned object is achieved is characterized, first of all, essentially by the following steps. From the transmission unit, an input signal is taken from the signal transmission element and determination of the measurement quantity by the measurement unit is induced from the transmission unit. The transmission unit transfers to the measurement unit at least one comparison signal which corresponds to the input signal. From the measurement unit, by comparison of the comparison signal with the stored signal, a comparison result is determined, and depending on the comparison result, either in one case, the measurement signal which has been generated following the determination of the measurement quantity is transferred from the measurement unit to the transmission unit, or in the other case, the transmission unit is shifted into a definable state and/or an error signal is transferred to the transmission unit.

In the method in accordance with the invention, an input signal from the signal transmission element is thus taken from the transmission unit, and it induces determination of the measurement quantity by the measurement unit. A comparison signal which is dependent on the tapped input signal is transmitted to the measurement unit. The transfer of the comparison signal can also comprise triggering the measurement by the measurement unit. However, alternatively, this can also take place separately from the transfer of the comparison signal. In one configuration, the comparison signal essentially corresponds to a measurement signal which would be transferred from the transmission unit as such an output signal to the signal transmission element and which is identical to the tapped input signal.

The signal transmission element is, for example, an interface of a field bus or a two-wire connection site or any type of a field bus itself or any communication element or line element for a 4.20 mA signal, for example. In one example, it is an electrical conductor. The type of configuration of the signal transmission element however has no effect on the invention and is only an element to which the transmission unit transfers the output signal or from which it receives or taps the input signal. Thus, it can be, for example, a wireless radio link.

The measurement unit carries out the actual measurement, and under a condition which is described below, transfers the measurement signal, which results from the measurement, to the transmission unit. Furthermore, the measurement unit receives the comparison signal and compares it to a filed or stored signal. Proceeding from a resulting comparison result, the measurement unit transfers the measurement signal to the transmission unit or it shifts the transmission unit into a definable, i.e., preferably, safe state or transfers an error signal to the transmission unit.

Preferably, a positive comparison result leads to the measurement signal being transferred to the transmission unit. "Positive comparison result" in this connection means that the comparison signal and the stored signal are in a relationship such that the comparison signal corresponds to "expectations" as it reflects the stored signal. A "negative comparison result" means that, at at least one site of the transmission chain, an error has occurred so that, therefore, the comparison signal—for example, beyond a definable tolerance range—does not correspond to what it should be. Alternatively, an error could also occur in that the preceding measurement signal has not been correctly stored or that an error has occurred at the storage site. If this deviation occurs, either the transmission unit is shifted into a definable state, for example, is shifted into a protected state, or the measurement unit transfers an error signal to the transmission unit. If the measurement unit shifts the transmission unit into a definable state, in this way, a further communication between the measurement unit and transmission unit with respect to the error can also be eliminated or the transmitter in itself does not require explicit error signaling in the direction of a downstream unit or higher-level unit since the presence of an error can already be read off on its state, for example, on its charging state.

It is advantageous in the method in accordance with the invention that the measurement unit, itself, performs a test for the presence of an error and that there need not be a further unit. Thus, the structure is more compact and economical. Furthermore, the method also makes it possible to glance out of the transmitter by the input signal being tapped by the signal transmission element, and thus, it being also ascertained whether the signal transmission element is carrying the correct signal or whether the correct signal had arrived in the signal transmission element after the preceding measurement.

One advantageous configuration calls for the generated measurement signal to be transferred from the measurement unit to the transmission unit and also the generated, i.e., current measurement signal to be stored in the case in which the comparison result consists in that the comparison signal and the stored signal are within a definable tolerance range. Depending on the type of allowable fluctuations or disruptions, the tolerance range can be dictated to be larger or smaller. In one configuration, it is especially provided that the comparison signal and the stored signal must be essentially identical. Altogether however, the state in which the comparison signal and the stored signal correspond leads to the measurement signal being transferred to the transmission unit, and thus, being released for further output and the measurement signal for the next measurement, and thus, also for the next comparison to the comparison signal being stored. Thus, the measurement unit retains the preceding measurement signal and generates a current measurement signal. In one alternative configuration, the current measurement signal is stored, for example, by the transmission unit.

In another configuration, there is additional error monitoring such that the transmission unit shifts the signal transmission element into a definable state and/or transfers an error signal to the signal transmission element when the instant of determining the measurement quantity and/or the transfer of the measurement signal by the measurement unit lie(s) outside a definable time window. In this configuration, the measurement or the transfer of the measurement signal is provided with a time stamp. If the measurement instant or the instant of the transfer of the measurement signal is outside a definable time interval, this is recognized by the transmission unit and thereupon triggers an error signal or shifts the signal transmission element into a definable, i.e., especially safe state. With this, therefore, it is recognized that the measurement or the transfer of the measurement signal has taken too long.

One configuration of the method in accordance with the invention relates to the case of a deviation between the comparison signal and the stored signal, this negative comparison result leading to the transmission unit being shifted into a definable state by the measurement unit and an error signal being transferred to the transmission unit by the measurement unit's acting on a connecting line which is used for power supply to the measurement unit by the transmission unit. In this configuration the transmission unit supplies energy to the measurement unit via a connecting line.

In a negative comparison case, the measurement unit acts on the connecting line by setting, for example, an energy demand which is outside the normal range or by it, in turn, causing an energy state in the transmission unit which differs from the normal state or a normal behavior of the transmission unit. This can be recognized especially advantageously by a unit which is of a higher level than the transmitter and can be interpreted, for example, as an error. If the measurement unit especially takes power from the transmission unit, it advantageously forces the transmission unit into a safe, i.e., de-energized or at least lower-energy state relative to normal operation. This configuration goes along with the especially advantageous version that the charging state of the transmission unit is influenced via the connecting line such that monitoring of the charging state of the transmission unit detects a charging state error. In this configuration, the measurement unit influences the charging state of the transmission unit such that this is recognized as an error in the monitoring of the charging state. If the transmission unit has, for example, a capacitor for charge storage, and in the case of an error, the measurement unit discharges a capacitor with a time constant clearly different from that as occurs in the normal case in the capacitor; this can be used for recognizing the error or its signaling and is especially also apparent to another unit which is downstream or of higher level than the transmitter and which, for example, supplies the transmission unit with energy or which monitors its charging state.

This object is achieved according to another teaching of the invention in the initially named, especial safety or safety-relevant transmitter in that the transmission unit is made for transmitting the electrical output signals to the signal transmission element and for taking electrical input signals from the signal transmission element. Moreover, the transmission unit and the measurement unit are made and matched to one another such that the transmission unit induces a determination of the measurement quantity by the measurement unit and that the transmission unit transfers at least one comparison signal which is dependent on the input signal to the measurement unit. The measurement unit is made to transmit the measurement signal to the transmission unit and to receive the comparison signal from the transmission unit. Furthermore, the measurement unit has at least one comparison unit which, by comparison of the comparison signal to a signal which is stored in a storage unit, determines a comparison result. Finally, the transmission unit and the measurement unit are made and matched to one another such that, depending on the comparison result, the measurement unit transfers either the measurement signal generated following the determination of the measurement quantity to the transmission unit or shifts the transmission unit into a definable state and/or transfers an error signal to the transmission unit.

The measurement unit and the transmission unit of the transmitter in accordance with the invention are, thus, characterized at least in that they send and also receive electrical signals. For the measurement unit, this means sending in the direction of the transmission unit and receiving an electrical signal from the transmission unit. For the transmission unit, this means that it sends and receives the electrical signals relative to the measurement unit and that it sends electrical signals to the signal transmission element and receives electrical signals from the signal transmission element. The transmission unit thus sends not only an output signal to the signal transmission element, but it also retrieves an input signal from the signal transmission element as a signal which is preferably currently being carried by the signal transmission element.

Moreover, a signal is also transmitted from the transmission unit to the measurement unit. In addition, the measurement unit is equipped with a particular functionality such that it compares the comparison signal which has been sent to it from the transmission unit with a stored signal and chooses between alternatives based on the comparison result. If the result of the comparison is positive, i.e., the comparison signal and the stored signal match one another, the measurement signal is transferred from the measurement unit to the transmission unit. However, if the result is negative, an error signal is transferred from the measurement unit to the transmission unit or the transmission unit is shifted from the measurement unit into a definable state. In other words, the measurement unit in the transmitter in accordance with the invention is not only a unit for obtaining measurement signals, but is also able to act on the transmission unit which accesses the measurement unit. In particular, the measurement unit recognizes errors of the signal chain downstream of it by the value being sent back to it which, in the error-free state, has been output from the transmission unit to the signal transmission element for the prior measurement. The transmission unit is, for example, especially a converter arrangement.

In one configuration it is provided that the measurement unit has at least one sensor unit for taking the actual measurement according to any type of the prior art, as are known, for example, for field devices for process automation, and the storage unit. Furthermore, the measurement unit has, for example, a comparison unit for comparing signals which is made in one configuration as a logic unit. Furthermore, for example, in one version, there is also at least one interface for sending and receiving electrical signals. In the measurement unit, in one configuration, at least one intermediate signal is produced from an actual raw signal which is a direct result of the measurement. Further processing steps and/or filtering steps can likewise be implemented in the measurement unit depending on the configuration. The individual components of the measurement unit can also be combined into larger complexes.

One configuration of the transmitter in accordance with the invention calls for there to be at least one connecting line for transmitting energy between the measurement unit and the transmission unit. This connecting line is used especially to signal the presence of an error and to shift the transmission unit into a definable state. Therefore, an associated configuration also calls for the measurement unit to shift the transmission unit into a definable state and/or to transfer an error signal to the transmission unit by the measurement unit acting on the connecting line for transmission of energy. If the transmitter is, for example, a two-wire measurement device, a current characteristic and/or voltage characteristic or a value is set as is outside the characteristics or values which occur in a normal case by the measurement unit at the signal output of the transmission unit, i.e., on the two-wire interface of the signal transmission element, for example, in the case of an error, i.e., for a negative comparison result.

The above described configurations of the method in accordance with the invention can also be used in the transmitter in accordance with the invention named here, i.e., the remarks made on the method apply accordingly here. Conversely, the configurations of the transmitter in accordance with the invention can also be used in the method and the remarks apply accordingly to the implementation in the method in accordance with the invention.

In particular, there are now a host of possibilities for embodying and developing the method in accordance with the invention and the transmitter in accordance with the invention. In this regard reference is made to the following description of exemplary embodiments in conjunction with the drawings.

DETAILED DESCRIPTION OF THE INVENTION

Figure 1:
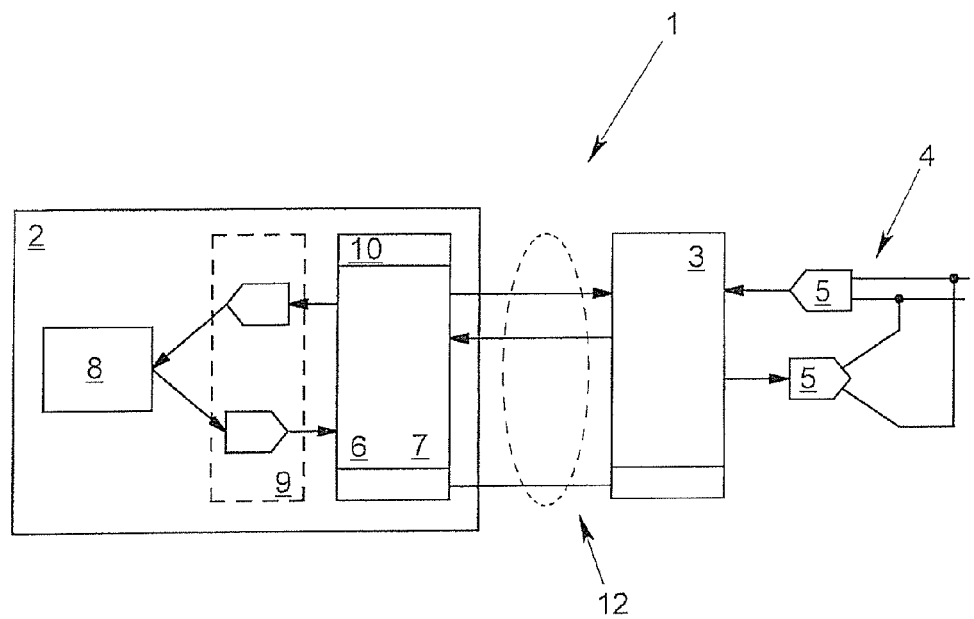
FIG. 1 shows a schematic of a transmitter in accordance with the invention and which illustrates essentially the active functional relationships using a block diagram, with a connection to a signal transmission element.
Figure 2:
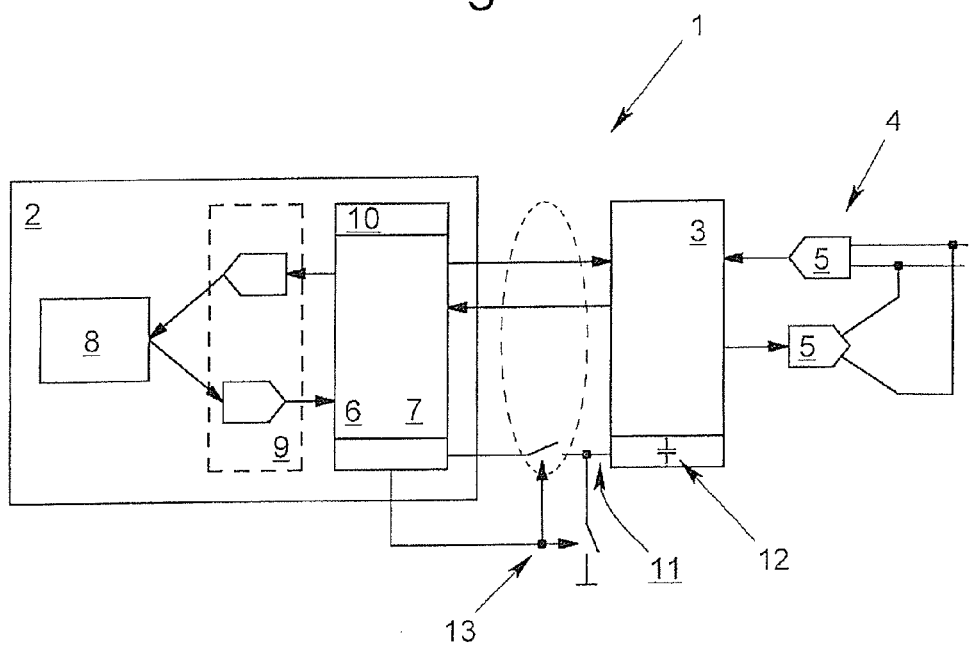
FIG. 2 shows a schematic of another exemplary embodiment of a transmitter in accordance with the invention with one example for shifting the transmission unit into a definable state in case of an error.
Figure 3:
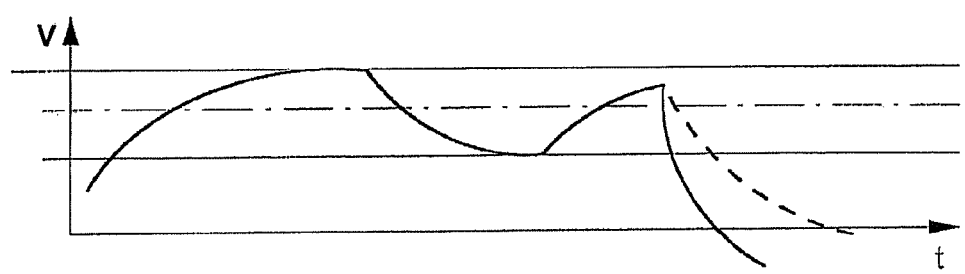
FIG. 3 is a graph of a time characteristic of a voltage signal of a transmission unit of the exemplary embodiment of FIG. 2.

FIGS. 1 & 2 each show different exemplary embodiments of a transmitter 1, the figures not being representations in the sense of correct electrical wiring diagrams, but rather indicating the active relationships between the different components of the transmitter 1. The signal characteristic which is shown in FIG. 3, fundamentally, shows the possible characteristics of voltage signals as can occur following the use of the method in accordance with the invention or in a transmitter in accordance with the invention. The characteristic of one exemplary embodiment in FIG. 4, fundamentally, describes a progression of steps, another grouping or another sequence likewise being possible and being within the scope of the invention.

The block diagram of FIG. 1 shows a transmitter 1 in accordance with the invention which has a measurement unit 2 and a transmission unit 3. Proceeding from a measurement of a physical and/or chemical measurement quantity or process quantity, the measurement unit 2 transfers a measurement signal to the transmission unit 3 which transfers the measurement signal in the form of an output signal to a signal transmission element 4. Thus the transmission unit 3 can also be called a converter which translates or converts the measurement signal into a bus-capable output signal, for example. The signal transmission element 4 is, for example, a part of a field bus or a dual wire. In the exemplary embodiment which is shown here, there are two bus drivers 5 which each are made to send or receive signals. As can be recognized here, in the transmitter 1 in accordance with the invention, several interfaces or components can also be used for signal transmission or can be arranged here in succession.

If the transmission unit 3 receives a measurement signal from the measurement unit 2, it transfers it as an output signal for example, via a field bus—as one example of a signal transmission element 4—to a higher-level unit which itself is not shown. For this purpose, the transmission unit 3 has at least one signal input for receiving the measurement signal from the measurement unit 2 and one signal output for output of the output signal. Moreover, in the transmission unit 3, there is a signal input on the side of the signal transmission element 4 by which the transmission unit 3 taps an input signal from the signal transmission element 4. In other words: the transmission unit 3 sends not only a signal as the output signal to the signal transmission element 4, but it also "hears" which signal is on the signal transmission element 4 or it taps this signal as an input signal. The input signal is communicated by the transmission unit 3 in the form of a comparison signal to the measurement unit 2.

In one configuration, the comparison signal is the measurement signal which the transmission unit 3 would convert into an output signal which would be essentially identical to the input signal. Moreover, the transmission unit 3 triggers a measurement by the measurement unit 2. This takes place in one configuration by the transmission of the comparison signal. In another configuration, the triggering of the measurement and the transmission of the comparison signal take place independently of one another by the transmission unit 3.

The measurement unit 2 has a transmitting and receiving unit 6 for signals and a comparison unit 7 which is used for comparison between the comparison signal and a stored signal. In the configuration shown here, a transmitting and receiving unit 6 and the comparison unit 7 are combined in one component. However, there can also be separate units. For the actual measurement, the measurement unit 2 has a sensor unit 8 which, for example, based on the measurement quantity to be measured (for example, flow rate, pressure, fill level, pH value, electrical conductivity, etc.) generates a raw signal which, in turn, is converted by an interface 9 for sending and receiving signals into the measurement signal.

If the measurement unit 2 is tasked by the transmission unit 3 to take a measurement and acquires a comparison signal, in the configuration shown in the figure, the comparison unit 7 compares the comparison signal to a signal which has been stored in the storage unit 10 and which in the configuration shown here is a component of the measurement unit 2. The stored signal is especially the measurement signal of the determination of the measurement quantity preceding the current measurement. If the comparison signal and the stored signal agree with one another within a certain tolerance range, this means that the measurement signal of the preceding measurement and the signal which is on the signal transmission element 4, which has been tapped as the input signal, and which should also agree with the measurement signal of the preceding measurement, match one another. In other words: in the preceding measurement, the measurement signal has been correctly transmitted to the signal transmission element 4 as an output signal, and the output signal can be read in again as the input signal. In doing so, especially, the input signal still carries the same information as the output signal or is preferably identical to it.

If the comparison result is positive, the active measurement signal is transferred to the transmission unit 3 and the active measurement signal is filed in the storage unit 10 in order to be available for the next measurement or for the next error monitoring. If the comparison between the stored signal and the comparison signal yields a negative result, the measurement unit 2 transfers either an error signal to the transmission unit 3 or it transfers the transmission unit 3 into a definable—preferably safe—state, i.e., in this second version the measurement unit 2 acts on the transmission unit 3. It is advantageous in the configuration that there need not be any additional components, but that the measurement unit 2, itself, monitors whether the measurement signal has been correctly relayed. Between the measurement unit 2 and the transmission unit 3, there is in addition a connecting line 11 via which power supply of the measurement unit 2 is carried out by the transmission unit 3. Details in this respect and one version can be found in the following FIG. 2 and in its description.

FIG. 2 shows a conversion which allows the measurement unit 2, in the case of an error, i.e., in the case that the comparison signal does not match the stored signal, to shift the transmission unit 3 into a protected state. For the sake of clarity, the same elements are provided with the same reference numbers as in FIG. 1. The transmission unit 3, in this configuration, has an energy storage device which is symbolized here by a capacitor 12. For shifting into the definable state, the measurement unit 2 is connected to a switch 13 which acts on the connecting line 11. In the normal case, i.e., in the state without errors, the connecting line 11 is closed and the transmission unit 3 supplies power to the measurement unit 2. In the case of an error, i.e., for a negative comparison result, the switch 13 opens the connection between the transmission unit 3 and the measurement unit 2, and connects the capacitor 12 of the transmission unit 3 to ground, and thus, discharges it. In this way, on the one hand, electrical energy is withdrawn from the transmission unit 3, and on the other hand, as is shown using FIG. 3, outside the transmitter 1 there is an easily recognizable indication that there is an error.

The discharge behavior of the capacitor 12 of the transmission unit 3 of FIG. 2 for the normal case and the error case is shown schematically in FIG. 3. FIG. 3 shows a time characteristic of a voltage U. First of all, as an example for the normal case as the absence of an error ascertained by the measurement unit, the behavior of the voltage on a capacitor during charging and discharging is conventional. Here, this is followed by a second increase of the voltage, the local maximum of the voltage being less than in a first charging process. Likewise, the normal withdrawal of the voltage, indicated here by the broken line, would take place appropriately to the preceding discharge. That is, the constants for the two discharge processes are essentially identical, and a charge monitoring unit which, for example, is downstream or of higher level than the transmitter detects nothing conspicuous based on the voltage characteristic.

The solid line corresponds to the case in which the comparison between the stored signal and the comparison signal in the measurement unit has turned out to be negative and in which the measurement unit has acted on the connecting line to the transmission unit such that the capacitor, named as an example, has been discharged to ground. This results in a much steeper discharge behavior which can be clearly recognized by a unit for monitoring the charging state of the transmission unit which is located, for example, in the transmission unit itself or in a unit downstream or of higher level than the transmitter, and thus, also leads to corresponding error signaling of the transmitter.

Figure 4:
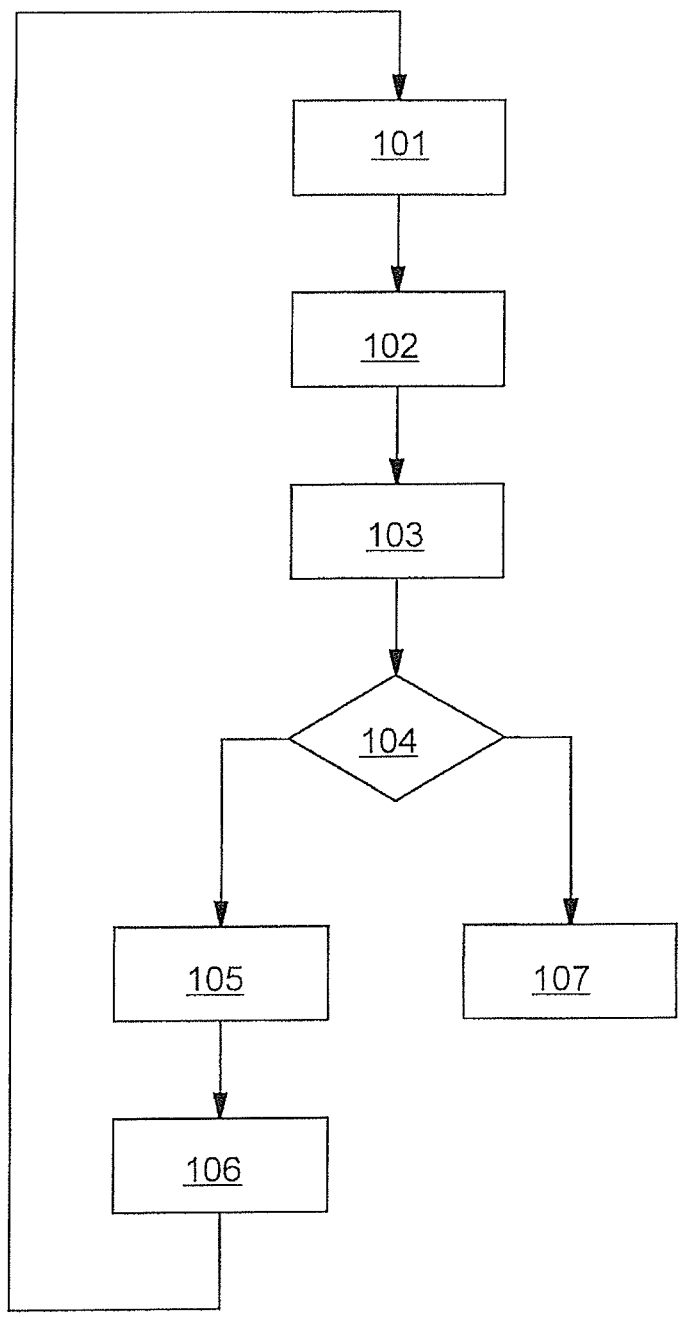
FIG. 4 is a schematic flow chart for an exemplary configuration of the steps of the method in accordance with the invention.

FIG. 4 schematically shows a flow chart of one configuration of the method in accordance with the invention. In a first step 101, the transmission unit taps the input signal from the signal transmission element. In the next step 102, the transmission unit transfers the comparison signal, which is dependent on the input signal, to the measurement unit, and here at the same time, induces the determination of the measurement quantity by the measurement unit. The measurement unit in step 103 undertakes the measurement, and thus, generates a measurement signal. In step 104, a comparison takes place in the measurement unit between the comparison signal of the transmission unit and the stored signal. If the comparison result is positive, in step 105, the measurement signal is stored for the next measurement and the measurement signal is transferred to the transmission unit. In step 106, the transmission unit transfers the measurement signal as an output signal to the signal transmission element and then step 101 follows for the next measurement. However, if the comparison result from step 104 is negative, in step 107, the measurement unit shifts the transmission unit into the definable state. In one alternative embodiment, following step 102, first of all, the comparison takes place in the measurement unit and the measurement is also only taken when the comparison has turned out to be positive, i.e., only when it makes sense due to the error-free state to have a measurement signal.

What is claimed is:

1. A method for monitoring a transmitter having a measurement unit, a transmission unit, a connecting line, and a signal transmission element that is part of a field bus, the measurement unit and the transmission unit being interconnected at least for transmission of signals and being connected by the connecting line for supplying power from the transmission unit to the measurement unit, comprising the steps of:
using the measurement unit to determine a measurement quantity and to produce a measurement signal which is dependent on the determined measurement quantity,
using the transmission unit to receive the measurement signal from the measurement unit and to transfer an output signal in converted form to the signal transmission element based on the measurement signal,
tapping signal from the signal transmission element and supplying the signal that has been tapped back to the transmission unit for transmission back to the measurement unit as a comparison signal,
inducing from the transmission unit, a determination of the measurement quantity by the measurement unit,
transferring the comparison signal, which corresponds to the signal tapped from the transmission element and input to the transmission unit from the transmission element, to the measurement unit,
comparing the comparison signal with a stored signal and producing a comparison result, and
depending on the comparison result, either the measurement signal which has been generated following the determination of the measurement quantity is transferred from the measurement unit to the transmission unit if a positive comparison result is produced or an error signal is transferred from the measurement unit to the transmission unit by acting on the connecting line if a negative comparison result is produced.

2. The method in accordance with claim 1, wherein, in an additional error monitoring, the transmission unit transfers an error signal to the signal transmission element when the instant of determining the measurement quantity lies outside a defined time window.

3. The method in accordance with claim 1, wherein the charging state of the transmission unit is influenced via the connecting line such that monitoring of the charging state of the transmission unit detects a charging state error.

4. A transmitter, comprising:
a signal transmission element that is part of a field bus,
a measurement unit for determining a measurement quantity and producing a measurement signal which is dependent on the measurement quantity determined,
a transmission unit that is interconnected with the measurement unit at least for transmission of signals, and being adapted for receiving the measurement signal from the measurement unit and transferring an electrical output signal to the signal transmission element based on the measurement signal,
a connecting line for transmitting energy between the measurement unit and the transmission unit, and
a storage unit,
wherein the transmission unit is adapted for inputting an electrical signal taken from the signal transmission element and to transfer a comparison signal, which is dependent on the signal input from the signal transmission element, to the measurement unit,
wherein the transmission unit and the measurement unit are constructed and matched to one another such that the transmission unit is able to induce a determination of the measurement quantity by the measurement unit,
wherein the measurement unit is made to transmit the measurement signal to the transmission unit and to receive the comparison signal from the transmission unit,
wherein the measurement unit has at least one comparison unit,
wherein the comparison unit is adapted to compare the comparison signal to a signal stored in the storage unit, and to produce a comparison result based thereon, and
wherein the measurement unit depending on the comparison result transfers either the measurement signal to the transmission unit or transfers an error signal to the transmission unit by acting on the connecting line so as to set an energy demand outside of a given normal range.

5. The method in accordance with claim 1, wherein the positive comparison result is produced in the case when the comparison signal and the stored signal agree with one another within a defined tolerance range, and wherein, when the positive comparison result is produced, the measurement signal which has been generated following the determination of the measurement quantity is stored as the stored signal.

6. The method in accordance with claim 1, wherein the transmission unit transfers an error signal to the signal transmission element when an instant of transfer of the measurement signal from the measurement unit to the transmission unit lies outside a defined time window.

7. The method in accordance with claim 1, wherein in the case of the negative comparison result, the error signal is transferred by acting on the connecting line via discharging a capacitor of the transmission unit with a time constant different from a time constant occurring in a normal case.

* * * * *